United States Patent
Ghosh

(10) Patent No.: US 7,079,954 B2
(45) Date of Patent: Jul. 18, 2006

(54) METHOD FOR SELECTIVE RECORDING OF SH WAVES USING AN ARRAY OF SENSORS TO FILTER OUT ALL NON SH WAVES

(75) Inventor: Santi K. Ghosh, Andhra Pradesh (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/813,650

(22) Filed: Mar. 31, 2004

(65) Prior Publication Data

US 2004/0204860 A1    Oct. 14, 2004

Related U.S. Application Data

(60) Provisional application No. 60/458,437, filed on Mar. 31, 2003.

(51) Int. Cl.
*G01V 1/28* (2006.01)

(52) U.S. Cl. .................................................. 702/17
(58) Field of Classification Search ................. 702/14, 702/17; 367/78, 153, 155, 156
See application file for complete search history.

(56) References Cited

U.S. PATENT DOCUMENTS

| | | | | |
|---|---|---|---|---|
| 6,005,916 A | * | 12/1999 | Johnson et al. | 378/87 |
| 6,041,018 A | * | 3/2000 | Roche | 367/46 |
| 6,366,537 B1 | * | 4/2002 | Sambuelli et al. | 367/178 |
| 6,723,929 B1 | * | 4/2004 | Kent | 178/18.04 |

\* cited by examiner

*Primary Examiner*—Donald McElheny, Jr.
(74) *Attorney, Agent, or Firm*—Nixon & Vanderhye P.C.

(57) ABSTRACT

Selective recording of SH waves using an array of vector-summed sensors filters out all non-SH waves.

10 Claims, 2 Drawing Sheets

Figure 1:
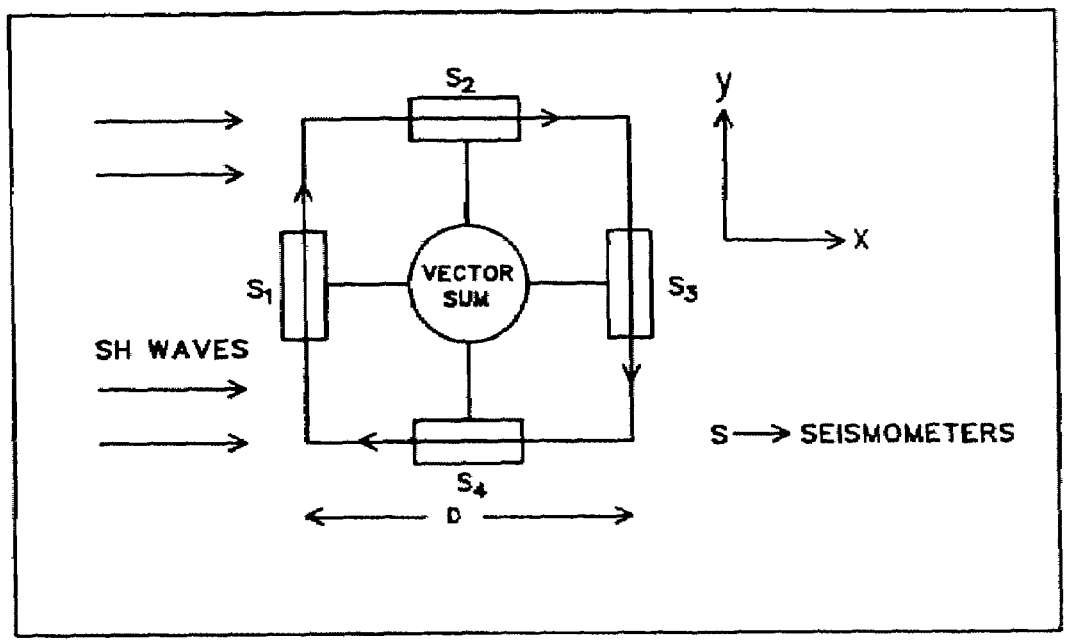

METHOD FOR SELECTIVE RECORDING OF SH WAVES USING AN ARRAY OF SENSORS TO FILTER OUT ALL NON SH WAVES

This application hereby claims and is entitled to the benefit of provisional application Ser. No. 60/458,437 filed Mar. 31, 2003.

FIELD OF THE INVENTION

The present invention relates to a novel method for selective recording of SH waves using an array of sensors that filter out all non-SH waves.

BACKGROUND OF THE INVENTION

Reflection seismology is a widely employed tool for the exploration of hydrocarbons. A ramification in this technology consists of using horizontally polarized shear waves (SH waves) in addition to more conventional exploration involving compressional (P) waves. In principle, the source for SH wave exploration must produce only SH waves and the earth must be strictly laterally homogeneous (Garotta, 1985). Under these assumptions, the horizontally polarized receivers are oriented along the y-direction perpendicular to the seismic line (x-direction). Any departure from either the source or the earth model, would of course cause recording of undesired modes of waves (designated "noise") by the receivers.

In particular, most SH sources also generate P waves, while many dynamite sources (e.g. in ±y method: Waters, 1987) generate P waves in the y (transverse) direction too (Edelman, 1985). A relevant result from Aki & Richards (1980) is that for a point source comprising of either a single force or a double couple in a homogeneous medium, the intermediate field displacements, both P and S, involve both radial and transverse components as does the near field displacement. Thus, a typical SH source would contain P motion even along y direction. The foregoing is based on the linear elastic theory, though a nonlinear physics governing the near-source region is expected to engender further complications not envisaged in the linear theory. The receiver, therefore, would record, in addition to the desired SH reflections; reflected P, scattered P-P and P-SH, all having components of motion along y direction. While the first (reflected P) owes its origin to the y motion of P in the source itself, the last two result from an interaction of P waves with lateral heterogeneity, which, though present, is not incorporated in the simplified model of the earth. The lateral heterogeneity can also give rise to SH-P type of scattering with components of motion along y direction. Therefore, due to non-ideal nature of the source and the earth, non-SH types of waves masquerade as SH-reflections and cause substantial error in processing and interpretation of data. Conventional recording methods can not circumvent this problem.

OBJECTS OF THE INVENTION

The main object of the present invention is to provide a novel method for selective recording of SH waves using an array of sensors that filter out all non-SH waves.

Another object of the present invention is to provide a design for an array of sensors that would selectively record SH waves and filter out all other kinds of waves.

Yet another object of the present invention is to provide a method for computing from the array recordings the SH motion that would be recorded by a hypothetical single receiver sensing only SH waves.

SUMMARY OF THE INVENTION

Accordingly the present invention provides a method for selective recording of SH waves using an array of sensors that filter out all non-SH waves, the method comprising:
(a) deriving a formula for computing a length of an arm of a square array of sensors based on the following presumptions:
 a. that the far-field S motion and the curl of the wave-field are approximately equivalent
 b. that the far-field SH motion and the vertical component of the curl of the wave-field are approximately equivalent
 c. that the vertical component of the curl of the wave field is equivalent to the vector sum of the recordings in four sensors placed in the four arms of a square array
(b) wherein the compounding effect of the array is that of a convolution with the impulse response of the array; and wherein
(c) the removal of the compounding effect of the array is equivalent to deconvolving the effect of the array which in turn is equivalent to dividing the array response by its transfer function.
(d) thereby selectively recording of SH waves while filtering out all non-SH waves.

The present invention also relates to a sensor array for the recordal of SH waves while filtering out all non-SH waves, the sensor array comprising a plurality of sensors connected with each other, in the shape of a regular polygon, each side of the polygon having a sensor at its midpoint aligned along the side.

In another embodiment of the present invention the vector sum is carried out by digitally summing the recordings of the individual sensors.

In yet another embodiment of the present invention the vector sum is carried out by summing by electronic means the recordings of the individual sensors.

In still another embodiment of the present invention the direction of arrival of SH waves in plan view can be at an arbitrary angle to the axis of the sensors.

In still yet another embodiment of the present invention the SH waves are plane waves.

In yet another embodiment of the invention, the SH waves are non-planar waves.

BRIEF DESCRIPTION OF THE INVENTION

In the drawing accompanying this specification FIG. 1 represents (a) a plan view of plane SH waves travelling in a non-vertical direction whose horizontal projection is parallel to X-direction (b) an array consisting of four sensors $S_1$, $S_2$, $S_3$, $S_4$ capable of recording only horizontal motions (c) The vector sum of the recordings in four sensors that would embody the SH motion.

Figure 2:
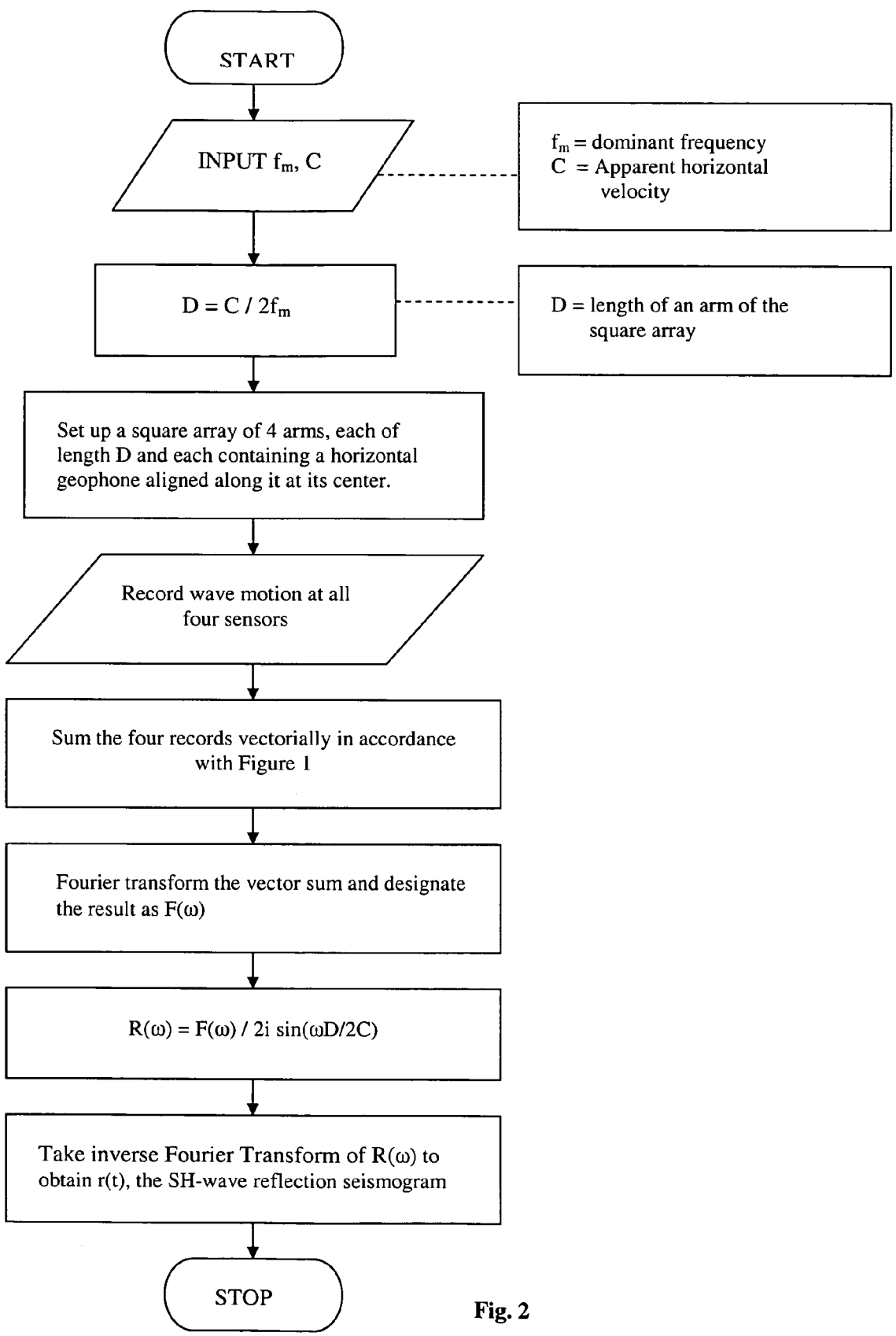

FIG. 2 is a flow chart of the method of the invention.

DETAILED DESCRIPTION OF THE INVENTION

The present invention relates to novel design of an array of sensors which would selectively record SH-waves and would filter out all other kinds of waves, and to the operational principles of the array.

The independence of SH motion from P motion, for sufficiently high frequencies, leads to a criterion that the vertical component of the curl of the wavefield has an exclusive correspondence with SH waves. Further, the vertical component of the curl of the wavefield is shown to be equivalent to a line integral of the wavefield along a closed loop. The integral itself can be computed by summing the individual recordings from an array of differently directed horizontal sensors conjuring up a closed loop. The compounding effect of the array can be undone to recover the true SH motion that would be recorded by a hypothetical single geophone sensing only SH waves. Any horizontal motion other than SH, originating either from the source or from the earth, will have no effect on the recording array which, as designed, is sensitive only to SH waves.

Presently in the industry, the selective recording of SH waves is carried out by aligning the axes of the horizontal geophones in the transverse horizontal direction, i.e., the horizontal direction perpendicular to the seismic line. This strategy would work only under the assumption that the motion in the transverse direction represents only SH waves. Such an assumption, however, is belied by two commonly encountered factors in exploration. First, a seismic source can generate non-SH waves in the transverse direction. Second, a laterally heterogeneous earth would also give rise to non-SH waves in the transverse direction. The working of the proposed array does not require the said assumption to be valid, i.e., the array would succeed in the selective recording of SH waves even when the source or the laterally heterogeneous earth generates non-SH motion in the transverse direction.

The explanations for various mathematical symbols used in this specification are given at the end of the description. A well known result for homogeneous media is that far-field P-waves are longitudinal and S-waves transverse. The same holds true for general inhomogeneous media, where ray theory is a tenable approximation (Aki and Richards, 1980). But then one must consider only such high frequencies which render the far-field and the ray-theoretical approximations adequate. In particular the wavelengths involved should only be small fractions of the total propagation distance and there should be little back-scattering of waves by the inhomogeneities of relatively smaller scale-lengths. It turns out that the frequencies that would minimize back-scattering would also be adequate for the far-field approximation. Wu (1989) summarizes the typical scale-length, of the inhomogeneities occurring in the crust. The smallest among these, in the intermediate scale applicable to exploration, is about 300 m. Although this value is for an average crust, it's application can be extended to sedimentary basins which would contain smoother variations than the crystalline rocks. Then, even for a shear wave velocity as high as 3000 m/s and a frequency as low as 15 Hz, the product of the wavenumber and the scale length of inhomogeneity would be around 10, when backscattering would be negligible (Wu, 1980).

The longitudinal nature of P-waves and the transverse nature of S-waves can be shown to imply their independence, and also that P-waves are annihilated by the vectorial operator "curl" whereas the S-waves are preserved by the same operator. In particular, SH motion would correspond to the vertical component of the curl of the wave field. According to Stoke's theorem the vertical component of the curl is proportional the line integral of the wave field along a closed contour in the horizontal plane. In practice, the line integral can be mimicked in the following manner.

The closed contour can be represented by the periphery of a regular polygon of n sides, e.g. a square (FIG. 1). Then at the midpoint of each side of the square a receiver measuring the horizontal motion along that side is placed. The direction of positive motion for each sensor is so arranged that such individual directions together constitute either a clockwise or an anticlockwise sense for the array of sensors as a whole. In other words, if such directions are marked by arrows on the sides of the square, then all the arrows together should unambiguously depict either a clockwise or a counter-clockwise sense. A vector sum of the output of all the sensors would then represent the line integral. This vector sum will exclusively be a measure of the SH motion. It is shown in EXAMPLE-I that the effect of the array along with the line integral is given by a filter of a specific mathematical form, and that one can undo the effect of the filter to recover the true SH motion that would be recorded by a hypothetical single receiver sensing only SH waves. The flow chart (FIG. 2) discloses the procedure for implementing the method for selective recording of SH waves using an array of sensors that would filter out all other kinds of waves.

The following example is given by way of illustration and therefore should not be construed to limit the scope of the present invention.

EXAMPLE-I

Assume plane SH wave propagating in a nonvertical direction whose horizontal projection is parallel to the X-direction (FIG. 1). Then, only the geophones aligned parallel to Y-direction (i.e. the geophones $S_1$ and $S_3$) will sense the SH motion, while the two placed parallel to X-direction i.e. ($S_2$ and $S_4$) will sense nothing. The motion sensed in $S_1$ and $S_3$ will be identical except for a time delay and a reversal of sign. Thus the effect of the array along with the line integral is given by a filter whose impulse response is $$h(t) = \delta(t+t_o/2) - \delta(t-t_o/2), \qquad \text{Eq.1}$$

Where $t_o = D/C$, D=length of an arm of the square array, C=apparent horizontal velocity of the wave (C=V/sin θ, where V is the true wave-velocity and θ the angle between the vertical and the true travel-direction of the wave) and where the time origin corresponds to the arrival time at the center of the array. In other words, the array will record an anti-symmetric waveform whose pivot of anti-symmetry will correspond to the arrival time at the center of the array. A Fourier transform of h(t) yields the transfer function H(ω) according to $$H(\omega) = 2i \sin(\omega D/2C), \qquad \text{Eq.2}$$

where ω is the angular frequency and i the imaginary unit.

Although the above considerations are based on a particular choice of the coordinate system, where X-axis coincides with the apparent horizontal direction of the wave propagation, there is no essential loss of generality, as the curl operation is independent of the orientation of the coordinate axes.

The response in equation (2) is maximum when $$\omega D/2C = (2n+1)\pi/2, \; n=0,1,2,3 \ldots \text{etc.} \qquad \text{Eq.3}$$

A particular case of this occurs when n=0 when the frequency, f satisfies $$f = C/2D. \qquad \text{Eq.4}$$

D is chosen such that the dominant frequency expected satisfies the last relation. To illustrate, if the dominant frequency is 45 Hz then one should choose D according to $$D = C/90. \qquad \text{Eq.5}$$

Under this condition the dominant frequency will be enhanced by a factor of 2, whereas all other frequencies between 15–75 Hz will undergo enhancement by factors varying between 1 and 2. The frequencies 0 and 90 Hz will be annihilated and the frequencies in the range 0–15 Hz and 75–90 Hz will suffer attenuation.

One notes that the window of 15–75 Hz is a reasonable range for SH exploration. For this example, other maxima will occur at f=135 Hz, f=225 Hz etc., which will be immaterial because of the attenuation characteristics of the earth and the imperative choice of a recording band that would exclude these frequencies.

The effect of the array is that of a filter given by equation (2). This effect can be removed by dividing the Fourier transform of the array recording by the transfer function given in equation (2). An inverse Fourier transform of the resulting data yields the SH motion that would be recorded by a hypothetical single receiver sensing only SH waves.

The Main Advantages of the Present Invention are:
1. The SH array of the invention selectively records only SH-waves. It is effective for any type of source and also for any type of earth model including a laterally heterogeneous earth.
2. The array will filter out all coherent noise, P-waves, micro-seismic and cultural noise of Rayleigh type which is polarized mostly in the vertical plane.
3. The array will be effective in dispensing with the second recording, normalization and subtraction common to all versions of ±y method in general and the SYSLAP method in particular.

Glossary of Mathematical Symbols and their Explanations:
curl A=∇×A (Aki and Richards, 1980), where A is any vector
i=the imaginary unit.
h(t)=The impulse response of the array
δ(t)=The Dirac delta function
D=The length of an arm of the square array
C=Apparent horizontal velocity of the wave
=V/sin θ, where V is the true wave-velocity and θ the angle between the vertical and the true travel—direction of the wave.
$t_o$=D/C
f=frequency of the wave.
ω=angular frequency of the wave=2π f
H(ω)=transfer function of h(t)
$f_m$=dominant frequency of the wave
Vector sum=Vectorial sum of the recordings in the four sensors of the array.
F(ω)=Fourier transform of the vector sum
r(t)=The SH wave reflection seismogram
R(ω)=Fourier transform of r(t)=F(ω)/2i sin(ωD/2C)

REFERENCES

1. Aki, K. and Richards, P. G., 1980, Quantitative Seismology, Vols. 1 and 2, W. H. Freeman and Co., San Franscisco.
2. Edelmann, H. A. K., 1985, "Shear wave energy sources" in Seismic Shear Waves, Part B, G. P. Dohr editor, Geophysical Press, London-Amsterdam.
3. Garotta, R., 1985, "Observation of shear waves and correlation with P events" in Seismic Shear Waves, Part B, G. P. Dohr editor, Geophysical Press, London-Amsterdam.
4. Waters, K. H., 1987, Reflection Seismology, $3^{rd}$ ed: John Wiley & Sons, New York.
5. Wu, R. S., 1989, "Seismic wave scattering", in The Encyclopedia of Solid Earth Geophysics, pp 1166–1187, David E. James editor: Van Nostrand Reinhold Co., New York.

I claim:

1. A method for selective recording of SH waves using an array of sensors that filter out all non-SH waves, the method comprising:
   (a) generating a vector sum of outputs from a plurality of seismic sensors arrayed with at least one sensor arm disposed along each side of a square array having a sensor arm length D chosen such that:
      a. far-field S motion and the curl of the wave-field are approximately equivalent,
      b. far-field SH motion and a vertical component of the curl of the wave-field are approximately equivalent, and
      c. that the vertical component of the curl of the wave field is equivalent to the vector sum of the sensors placed in the four arms of said square array;
   wherein the compounding effect of the array is that of a convolution with the impulse response of the array; and
   (b) removing the compounding effect of the array which is equivalent to deconvolving the effect of the array which, in turn, is equivalent to dividing the array response by its transfer function, thereby selectively recording SH waves while filtering out all non-SH waves.

2. A method as in claim 1 wherein said vector sum is carried out by digitally summing recordings of individual sensors of the sensor array.

3. A method as in claim 2 wherein said vector sum is carried out by electronic means summing the recordings of the individual sensors.

4. A method as in claim 1 wherein the direction of arrival of SH waves in plan view at an arbitrary angle to the axis of the sensors does not materially change the recorded result.

5. A method as in claim 1 wherein the SH waves are plane waves.

6. A method as in claim 1 wherein the SH waves are non-planar waves.

7. A method as in claim 1 wherein the sensor array records only SH-waves, while filtering out all coherent noise, P waves, microseismic and cultural noise of Rayleigh type.

8. A seismic sensor array for recording SH waves while filtering out all non-SH waves, the sensor array comprising:
   a plurality of seismic sensors arrayed in the shape of a regular polygon, each side of the polygon having at least one sensor at its midpoint aligned along that respective side; and
   each sensor being connected for vector summation of its output with that of all other sensors.

9. A method for filtering and recording SH seismic signals, said method comprising:
   (a) arraying at least one seismic sensor on each arm of a square array of arm length D where $$D \cong C/2 \, f m$$

C being the apparent horizontal velocity of expected seismic waves, and fm being the dominant frequency of said expected seismic waves;

(b) generating a vector sum of sensor-detected wave motion at each arm of the square array;

(c) generating the Fourier Transform $F(\omega)$ of said vector sum;

(d) generating $R(\omega)=F(\omega)/2i\sin(wD/2c)$; and (e) generating the inverse Fourier Transform of $R(\omega)$ to provide r(t), a SH-wave reflection seismogram.

10. A method as in claim 9 wherein each of said seismic sensors comprises at horizontal geophone aligned and centered along a respective arm of the square array.

* * * * *